(12) United States Patent
Nishiyama et al.

(10) Patent No.: US 10,442,398 B2
(45) Date of Patent: Oct. 15, 2019

(54) VEHICLE CONTROL SYSTEM

(71) Applicant: TOYOTA JIDOSHA KABUSHIKI KAISHA, Toyota-shi, Aichi-ken (JP)

(72) Inventors: Shigeki Nishiyama, Nagoya (JP); Tomoyuki Funayama, Toyota (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 0 days.

(21) Appl. No.: 15/834,597

(22) Filed: Dec. 7, 2017

(65) Prior Publication Data
US 2018/0222444 A1 Aug. 9, 2018

(30) Foreign Application Priority Data
Feb. 7, 2017 (JP) ................. 2017-020454

(51) Int. Cl.
B60R 25/24 (2013.01)

(52) U.S. Cl.
CPC ................. B60R 25/24 (2013.01)

(58) Field of Classification Search
CPC .. G07C 2209/08; G07C 9/00; G07C 2209/63; G07C 9/00309; B60R 25/00; G01S 2013/466
See application file for complete search history.

(56) References Cited

U.S. PATENT DOCUMENTS

| | | | | |
|---|---|---|---|---|
| 9,764,714 B2* | 9/2017 | Suzuki | | B60R 25/32 |
| 2005/0237152 A1* | 10/2005 | Nakashima | | B60R 25/246 |
| | | | | 340/5.65 |
| 2007/0290794 A1* | 12/2007 | Teshima | | B60R 25/24 |
| | | | | 340/5.64 |
| 2009/0085720 A1* | 4/2009 | Kurpinski | | B60R 25/246 |
| | | | | 340/5.64 |
| 2009/0091423 A1* | 4/2009 | Nagaoka | | B60R 25/24 |
| | | | | 340/5.72 |
| 2009/0284345 A1 | 11/2009 | Ghabra et al. | | |
| 2016/0267735 A1* | 9/2016 | Hamada | | G07C 9/00309 |
| 2016/0297399 A1* | 10/2016 | Suzuki | | B60R 25/32 |
| 2017/0096122 A1* | 4/2017 | Khan | | G07C 9/00309 |

FOREIGN PATENT DOCUMENTS

| | | |
|---|---|---|
| JP | 2004-003147 A | 1/2004 |
| JP | 2012-026141 A | 2/2012 |
| JP | 2018-061157 A | 4/2018 |

* cited by examiner

Primary Examiner — Mirza F Alam
(74) Attorney, Agent, or Firm — Oliff PLC

(57) ABSTRACT

Provided is a vehicle control system that performs detection and authentication of an electronic key being present in a detection range on a periphery of a vehicle, on the basis of polling performed by an on-vehicle apparatus. Any one of the on-vehicle apparatus and a first electronic key includes: a determination section configured to determine whether or not communication, between the on-vehicle apparatus and the first electronic key, in which the first electronic key returns a signal in response to a signal transmitted from the on-vehicle apparatus is continuously performed for not less than a predetermined time period; and a first processing section configured to restrict a response, by the first electronic key, to a first polling signal transmitted from the on-vehicle apparatus, when the determination section has determined that the communication is continuously performed for not less than the predetermined time period.

4 Claims, 10 Drawing Sheets

VEHICLE CONTROL SYSTEM

BACKGROUND OF THE INVENTION

Field of the Invention

The present invention relates to a vehicle control system mounted to a vehicle.

Description of the Background Art

An electronic key system (also called wireless key system, keyless entry system, smart entry system, and the like) is present as one of the vehicle control systems mounted to vehicles. In this electronic key system, communication based on polling is performed between an electronic key carried by a user and an on-vehicle apparatus mounted to a vehicle, and predetermined processing such as detection and authentication is performed, so that the vehicle is controlled on the basis of the authentication result.

In the electronic key system, the on-vehicle apparatus transmits a polling signal to a detection range. When receiving the polling signal from the on-vehicle apparatus, the electronic key returns an acknowledge (ACK) signal to the on-vehicle apparatus. When receiving the ACK signal from the electronic key, the on-vehicle apparatus determines that the electronic key is present in the detection range and transmits a challenge signal toward the electronic key. When receiving the challenge signal from the on-vehicle apparatus, the electronic key returns, to the on-vehicle apparatus, a response signal that includes key-specific identification information. When receiving the response signal from the electronic key, the on-vehicle apparatus compares, for authentication, the identification information included in the response signal with identification information registered in advance in the on-vehicle apparatus itself. When the authentication has been verified, it is certified that the electronic key that has returned the response signal is an authenticated electronic key.

In a transmission and reception process, of the polling signal, the ACK signal, the challenge signal, the response signal, and the like, which is performed in communication based on the polling, and an authentication process (hereinafter, these processes are collectively referred to as "polling control"), current in accordance with the operations in the on-vehicle apparatus and the electronic key is consumed.

Since, in recent years, there is a vehicle in which lighting of lamps in a cabin of the vehicle or start-up of an in-vehicle network is controlled in accordance with detection of the electronic key, the amount of current consumed for the polling control is increased. Since the range in which the polling control can be performed is wider in the next-generation system than in the present-generation system, an electronic key that has not been detected until now may be subject to the polling control, so that cases in which current is consumed in the on-vehicle apparatus and the electronic key are predicted to be further increased.

Therefore, as a technique for suppressing current consumption in the on-vehicle apparatus and the electronic key, for example, a method, as disclosed in Patent Literature 1 (Japanese Laid-Open Patent Publication No. 2012-026141), for appropriately controlling the intervals at which the polling signal is transmitted between the electronic key and the on-vehicle apparatus, is proposed.

In the control of the above-described Patent Literature 1, the current consumption in the on-vehicle apparatus and the electronic key is suppressed by extending the intervals of transmitting the polling signal. However, there is a problem that, when the electronic key is staying for a long time period in a polling signal detection range, communication for the polling control is continuously performed and current consumption in the on-vehicle apparatus and the electronic key is increased.

In the control of the above-described Patent Literature 1, current consumption in the on-vehicle apparatus and the electronic key is suppressed by stopping the transmission of the polling signal under a specific condition. However, there is a problem that, when the transmission of the polling signal has been stopped, operations by all the electronic keys including both the target electronic key and other electronic keys cannot be performed until stopping of the transmission thereof is cancelled, thus degrading a user's convenience.

SUMMARY OF THE INVENTION

The present invention is made in view of the aforementioned problem, and an object of the present invention is to provide a vehicle control system that allows suppression of current consumption in an electronic key and an on-vehicle apparatus without degrading the user's convenience, even when an electronic key staying for not less than a predetermined time period in the detection range of the on-vehicle apparatus is present.

In order to overcome the aforementioned problem, a first aspect of the present invention is directed to a vehicle control system that performs detection and authentication of an electronic key being present in a detection range on a periphery of a vehicle, on the basis of polling performed by an on-vehicle apparatus. Any one of the on-vehicle apparatus and a first electronic key includes: a determination section configured to determine whether or not communication, between the on-vehicle apparatus and the first electronic key, in which the first electronic key returns a signal in response to a signal transmitted from the on-vehicle apparatus is continuously performed for not less than a predetermined time period; and a first processing section configured to restrict a response, by the first electronic key, to a first polling signal transmitted from the on-vehicle apparatus, when the determination section has determined that the communication is continuously performed for not less than the predetermined time period.

In the first aspect, it is determined that the first electronic key is staying for not less than a predetermined time period in the detection range of the on-vehicle apparatus, on the basis of a time period in which communication, based on the first polling signal, between the on-vehicle apparatus and the first electronic key, is continued. When it has been determined that the communication is continued for not less than the predetermined time period, the communication performed between the on-vehicle apparatus and the first electronic key staying in the detection range is restricted. Specifically, a response, by the first electronic key, to the first polling signal is restricted.

In this control, in the first electronic key staying in the detection range, it is possible to suppress current consumption necessary for communication (transmission of ACK signal, reception of challenge signal, transmission of response signal, etc.) with the on-vehicle apparatus. Meanwhile, in the on-vehicle apparatus, it is possible to suppress current consumption necessary for communication (reception of ACK signal, transmission of challenge signal, reception of response signal, authentication processing, etc.) with the first electronic key.

Since, in the first aspect, communication performed only between the on-vehicle apparatus and the first electronic key staying in the detection range is restricted, the on-vehicle apparatus is able to perform communication, using the first polling signal, with another electronic key (e.g., second electronic key). Therefore, for example, it is possible to avoid a situation in which the user's convenience is degraded, such a situation in which, although the other electronic key is authenticated, the vehicle cannot be operated by an authenticated electronic key.

In a second aspect of the present invention based on the first aspect, as restriction of the response, the first processing section performs prohibition of the first electronic key from returning a response signal in response to reception of the first polling signal transmitted from the on-vehicle apparatus.

In the second aspect, a response by the first electronic key is restricted by prohibiting a response such that, even though receiving the first polling signal from the on-vehicle apparatus, the first electronic key staying in the detection range does not return the response signal (ACK signal). Therefore, it is possible to avoid a situation in which communication between the on-vehicle apparatus and the first electronic key has been continuously performed for not less than a predetermined time period.

In this control, in a system in which only one polling signal can be used in polling, it is possible to prohibit return of the response signal by the first electronic key continuously staying for a predetermined time period in the detection range of the on-vehicle apparatus while it is possible to operate the vehicle by another authenticated electronic key. Therefore, it is possible to suppress current consumption in the electronic key and the on-vehicle apparatus without degrading the user's convenience.

In a third aspect of the present invention based on the first aspect, the on-vehicle apparatus is able to transmit a second polling signal different from the first polling signal, the first electronic key is able to receive the second polling signal, and as restriction of the response, the first processing section changes the first polling signal transmitted from the on-vehicle apparatus into the second polling signal, and performs prohibition of the first electronic key from returning a response signal in response to reception of a signal other than the first polling signal.

In the third aspect, a response by the first electronic key is restricted by prohibiting a response such that a signal to be transmitted from the on-vehicle apparatus is changed from the first polling signal to the second polling signal and, even though receiving, from the on-vehicle apparatus, the second polling signal that is a signal other than the first polling signal, the first electronic key staying in the detection range does not return the response signal (ACK signal). Therefore, it is possible to avoid a situation in which communication between the on-vehicle apparatus and the first electronic key has been continuously performed for not less than a predetermined time period.

In this control, in a system in which a plurality of polling signals can be used in polling, it is possible to prohibit return of the response signal by the first electronic key continuously staying for a predetermined time period in the detection range of the on-vehicle apparatus while it is possible to operate the vehicle by another authenticated electronic key. Therefore, it is possible to suppress current consumption in the electronic key and the on-vehicle apparatus without degrading the user's convenience.

In a fourth aspect of the present invention based on the second aspect, the on-vehicle apparatus further includes a first authentication section configured to perform authentication processing for the first electronic key, on the basis of a user's predetermined operation using the first electronic key, and any one of the on-vehicle apparatus and the first electronic key further comprising a second processing section configured to cancel prohibition of the first electronic key from returning the response signal in response to the first polling signal, when the first authentication section has determined that authentication for the first electronic key has been verified.

In the fourth aspect, when a predetermined operation in which authentication has been verified is performed from the first electronic key being present (staying) in the detection range of the on-vehicle apparatus toward the on-vehicle apparatus has been successful is performed, the prohibition of the first electronic key from returning the response signal is cancelled. The predetermined operation is, for example, an operation of short-range radio communication.

In this control, in the system in which only one polling signal can be used in polling, it is possible to avoid such a situation that, for example, the first electronic key cannot be used for an indefinite time period, and it is possible to suppress degradation of the user's convenience.

In a fifth aspect of the present invention based on the third aspect, the on-vehicle apparatus further includes: a first authentication section configured to perform authentication processing for the electronic key, on the basis of a user's predetermined operation using the first electronic key or a second electronic key different from the first electronic key; and a second authentication section configured to change a signal to be transmitted from the on-vehicle apparatus from the second polling signal to the first polling signal and perform detection and authentication processing for the first electronic key, when the first authentication section has determined that the first electronic key and the second electronic key for which authentication has been verified are not present, and any one of the on-vehicle apparatus and the first electronic key further includes a second processing section configured to cancel prohibition of the first electronic key from returning the response signal in response to the reception of a signal other than the first polling signal, when the second authentication section has determined that the first electronic key has been detected in a predetermined range and authentication for the first electronic key has been verified.

In the fifth aspect, when a predetermined operation using any one of the electronic keys has been preformed and authentication between the on-vehicle apparatus and any one of the electronic keys is not successful, polling is performed using the first polling signal to which the first electronic key is not prohibited from responding to the response signal. When authentication for the first electronic key being present (staying) in a predetermined range has been verified, the prohibition of the first electronic key from returning the response signal is cancelled by the polling control using the first polling signal. The predetermined operation is, for example, a vehicle operation such as contact with a door handle, a communication operation from the second electronic key to the on-vehicle apparatus, or an operation of a short-range radio communication.

In this control, in the system in which the plurality of polling signals can be used in polling, it is possible to avoid such a situation that, for example, the first electronic key cannot be used for an indefinite time period and it is possible to suppress degradation of the user's convenience.

As described above, in the vehicle control system according to the present invention, it is possible to suppress current consumption in the electronic key and the on-vehicle apparatus without degrading the user's convenience, even when an electronic key staying for not less than a predetermined time period in the detection range of the on-vehicle apparatus is present.

These and other objects, features, aspects and advantages of the present invention will become more apparent from the following detailed description of the present invention when taken in conjunction with the accompanying drawings.

DESCRIPTION OF THE PREFERRED EMBODIMENTS

[Outline]

The present invention is a vehicle control system that performs detection and authentication of an electronic key being present in a detection range on a periphery of a vehicle on the basis of polling performed by the on-vehicle apparatus. The vehicle control system determines that the electronic key is staying for a long time period in the detection range of the on-vehicle apparatus, on the basis of a continuation time period during which communication performed between the on-vehicle apparatus and the electronic key is continued. When it has been determined that the communication is continued for not less than a predetermined time period, return of a response signal to the on-vehicle apparatus from the electronic key that has received the polling signal is prohibited. In this control, it is possible to suppress current consumption in the electronic key and the on-vehicle apparatus.

[Outline of Vehicle Control System]

Figure 1:
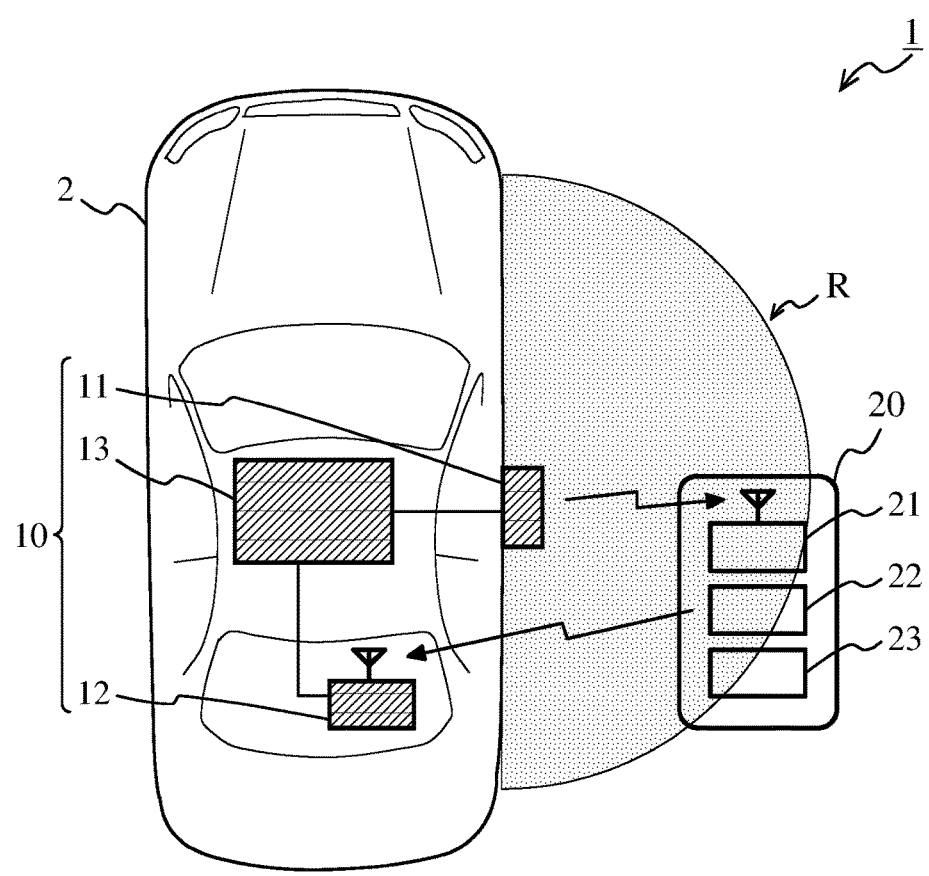
FIG. 1 is a diagram illustrating a schematic configuration of a vehicle control system according to the present invention.

FIG. 1 is a diagram illustrating an example of a schematic configuration of a vehicle control system 1 according to the present invention. In FIG. 1, the vehicle control system 1 according to the present embodiment includes an on-vehicle apparatus 10 mounted to a vehicle 2 and an electronic key (also called portable device) 20 that is portable and can be carried by a user or the like.

In the vehicle control system 1, on the basis of polling performed by the on-vehicle apparatus 10, in addition to detection of the electronic key 20 being present in the detection range on the periphery of the vehicle and performing the authentication processing, it is possible to perform processing of prohibiting the electronics key 20 from returning the response signal (ACK signal) in response to the polling signal, and it is possible to perform processing of cancelling prohibition of the electronic key 20 from returning the response signal. Hereinafter, processing performed in the vehicle control system 1 will be described on the basis of a difference in configuration between the on-vehicle apparatus 10 and the electronic key 20.

First Embodiment

In the vehicle control system 1 according to a first embodiment, the on-vehicle apparatus 10 determines a continuation time period for communication with the electronic key 20, and makes an instruction for prohibiting the electronic key 20 from returning the response signal in response to the polling signal.

<On-Vehicle Apparatus>

In FIG. 1, the on-vehicle apparatus 10 includes an LF transmission section 11, an RF reception section 12, and a vehicle control section 13.

On the basis of the instruction from the vehicle control section 13 described later, the LF transmission section 11 transmits a predetermined polling signal (or also referred to as "wake signal") or a predetermined challenge signal to a predetermined range R (hereinafter, referred to as "detection range R") formed outside a cabin of the vehicle, through a communication function section that is not shown. The polling signal is a signal used for finding the electronic key 20 being present on the periphery of the vehicle 2 and for waking up the electronic key 20 that has been detected in the detection range R. The polling signal is a signal that requests the woken-up electronic key 20 to return the ACK signal. The challenge signal is a signal that requests the woken-up electronic key 20 to transmit the response signal including identification information ID. The polling signal and the challenge signal are transmitted by, for example, low frequency (LF) communication.

The RF reception section 12 is able to receive, through the communication function section that is not shown, the ACK signal and the response signal transmitted from an RF transmission section 22 of the electronic key 20 described later. The response signal includes at least the identification information ID that is registered in advance so as to be specific to the electronic key 20 that has transmitted the response signal. When receiving the ACK signal or the response signal from the electronic key 20, the RF reception section 12 outputs the ACK signal or the response signal to the vehicle control section 13.

The vehicle control section 13 instructs the LF transmission section 11 to transmit the polling signal at predetermined intervals. When acquiring the ACK signal from the RF reception section 12, the vehicle control section 13 instructs the LF transmission section 11 to transmit the challenge signal. The vehicle control section 13 stores in advance the identification information ID for specifying the authenticated electronic key 20 that is permitted to perform vehicle control on the vehicle 2. When acquiring the response signal from the RF reception section 12, the vehicle control section 13 performs the so-called authentication processing of determining whether or not the identification information ID included in the response signal and identification information ID stored by the vehicle control section 13 itself are identical to each other. When the identification information ID included in the response signal and the identification information ID stored by the vehicle control section 13 itself are identical to each other, authentication is verified and it is determined that the electronic key 20 that has transmitted the response signal is an authenticated key.

The vehicle control section 13 performs processing of determining whether or not communication performed between the on-vehicle apparatus 10 and the electronic key 20, such as the communication in which the electronic key 20 for which authentication has been verified returns a signal in response to a signal transmitted from the on-vehicle apparatus 10, is continued for not less than a predetermined time period (corresponding to determination section in claim 1). The vehicle control section 13 performs processing of restricting a response, in response of the polling signal, of the electronic key 20 whose communication is continued for not less than the predetermined time period (corresponding to first processing section according to claims 1 to 3).

<Electronic Key>

In FIG. 1, the electronic key 20 includes an LF reception section 21, the RF transmission section 22, and a key control section 23.

The LF reception section 21 is able to receive, through the communication function section that is not shown, the polling signal and the challenge signal that has been transmitted from the LF transmission section 11 of the on-vehicle apparatus 10. When receiving the polling signal or the challenge signal from the on-vehicle apparatus 10, the LF reception section 21 notifies the key control section 23 that the polling signal or the challenge signal has been received.

The key control section 23 wakes up when receiving from the LF reception section 21 the notification that the polling signal has been received, and instructs the RF transmission section 22 to transmit the ACK signal. The key control section 23 stores in advance the identification information ID assigned so as to be specific to the authenticated electronic key 20 that is permitted to perform vehicle operation on the vehicle 2. When receiving from the LF reception section 21 the notification that the challenge signal has been received, the key control section 23 instructs the RF transmission section 22 to transmit the response signal including the identification information ID that is stored in advance.

On the basis of the instruction from the key control section 23, the RF transmission section 22 is able to transmit, to a predetermined range, the ACK signal or the response signal including the identification information ID through the communication function section that is not shown. The ACK signal and the response signal are transmitted by, for example, radio frequency (RF) communication.

<Control by Vehicle Control System>

Figure 2:
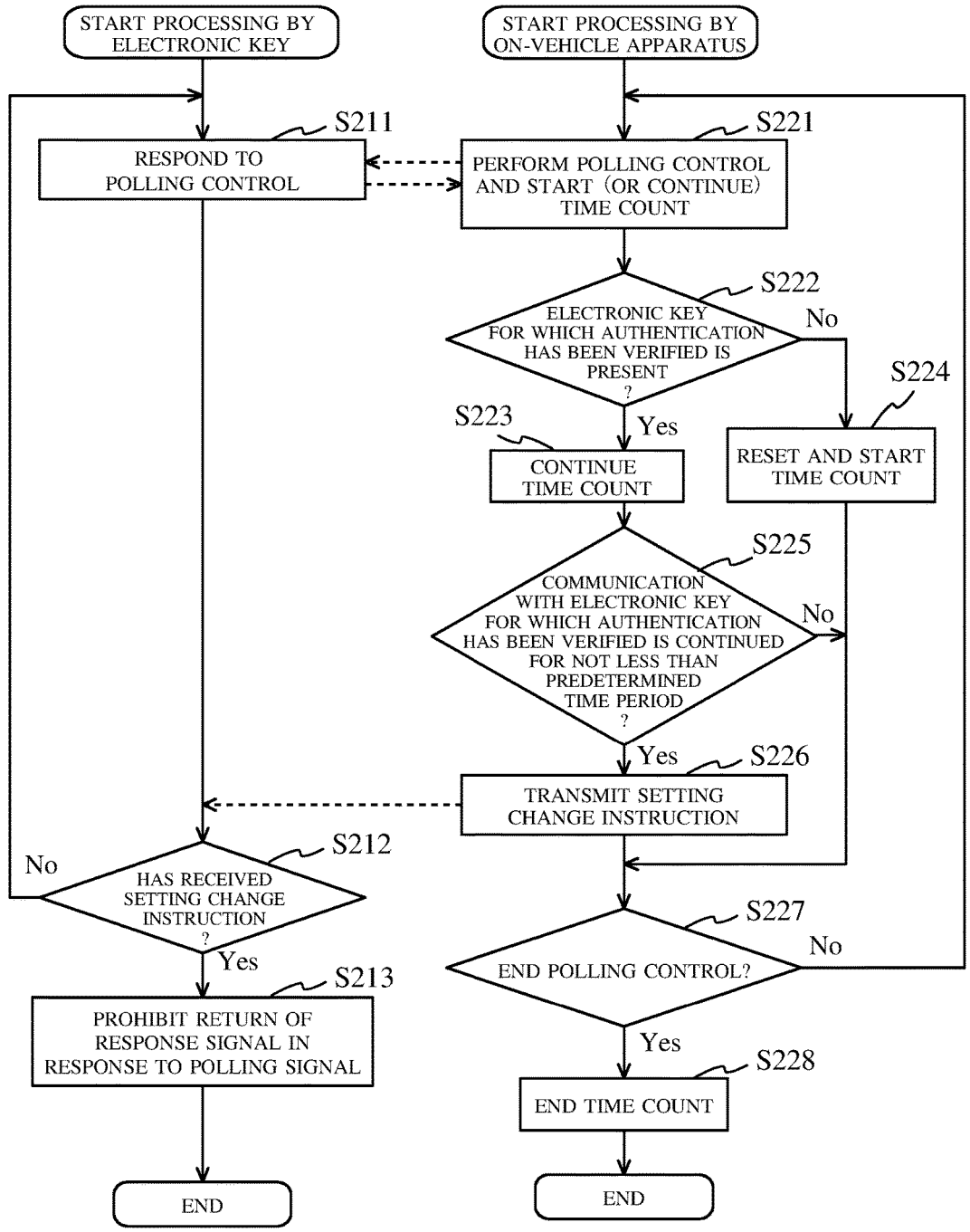
FIG. 2 is a flowchart showing a procedure of prohibition processing A1 performed by the vehicle control system.
Figure 3:
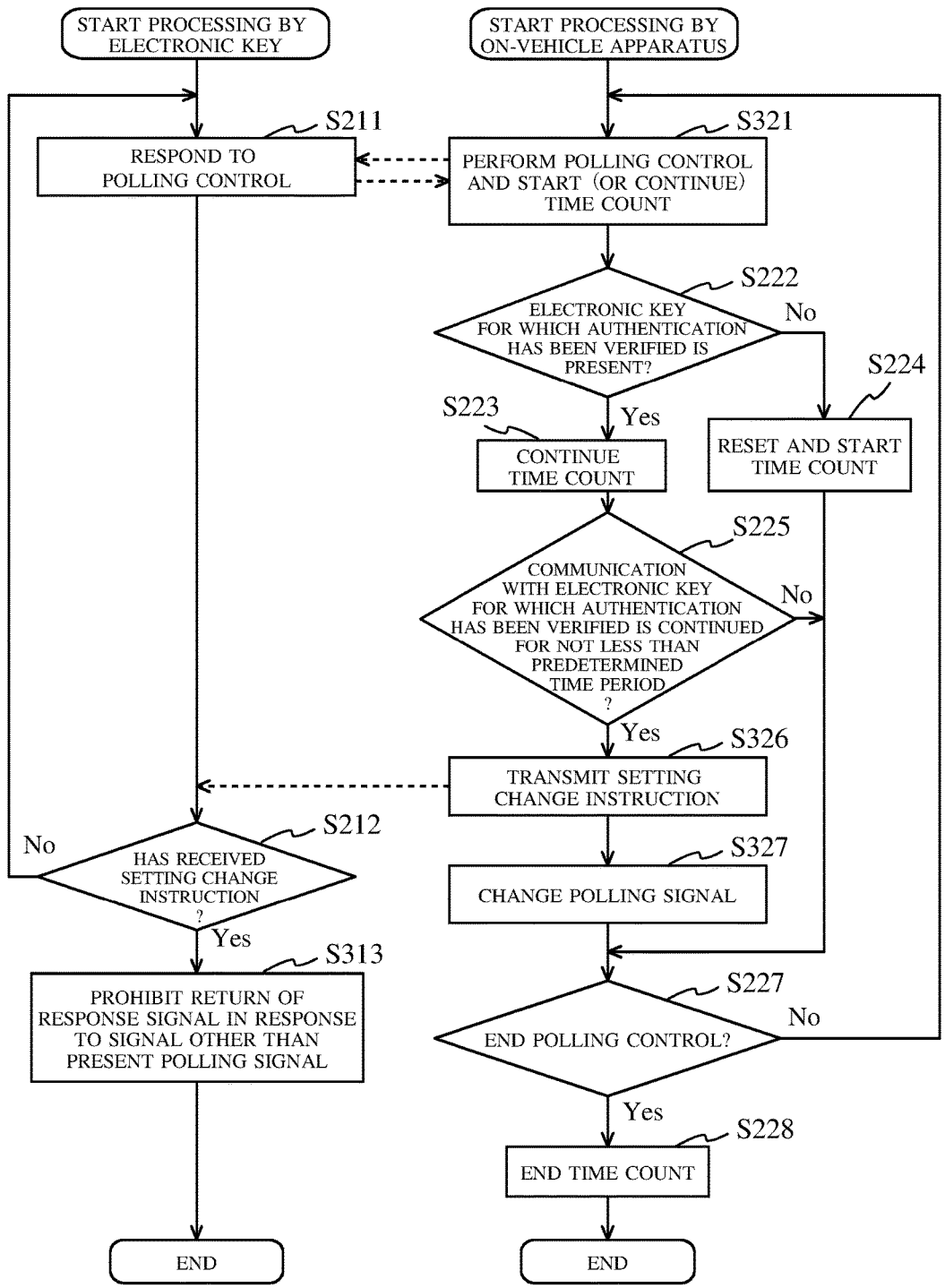
FIG. 3 is a flowchart showing a procedure of prohibition processing A2 performed by the vehicle control system.

FIG. 2 is flowchart showing a procedure of a specific example A1 of prohibition processing performed between the on-vehicle apparatus 10 and the electronic key 20 in the vehicle control system 1 according to the first embodiment. FIG. 3 is flowchart showing a procedure of a specific example A2 of the prohibition processing performed between the on-vehicle apparatus 10 and the electronic key 20 in the vehicle control system 1 according to the first embodiment.

1-1. Specific Example A1 of prohibition processing

The prohibition processing according to the specific example A1 shown in FIG. 2 is processing assumed for a system in which only one polling signal (e.g., only first polling signal) can be used in polling. It is possible to apply the prohibition processing to the case where, even in a system in which a plurality of polling signals (e.g., two polling signals that are first polling signal and second polling signal) can be used in the polling control, only either one of the polling signals is used.

In the prohibition processing according to the specific example A1, in a case where, for example, since the door of the vehicle 2 is locked, or the detection, based on polling, of the electronic key 20 being present outside the cabin of the vehicle has become necessary, a process step of step S221 in the on-vehicle apparatus 10 is started.

(Step S221)

In this process step, the polling control by the on-vehicle apparatus 10 is performed. More specifically, a predetermined polling signal is transmitted from the on-vehicle apparatus 10 toward the detection range R, and the electronic key 20 is searched for within the detection range R. When the ACK signal has been received from any one of the electronic keys 20, the challenge signal is transmitted and the response signal in response thereto is received, so that the authentication processing is performed. In the specific example A1, the first polling signal is transmitted from the on-vehicle apparatus 10.

In this process step, time measurement (time count) by the on-vehicle apparatus 10 is started. When time count has already been started, the time count is continued. Time to be measured is a time period in which communication performed between the on-vehicle apparatus 10 and the electronic key 20 is continued (hereinafter, referred to as "continuation time period T"). The time count can be started by, for example, using a timer prepared in advance to reset and start the timer.

When there are a plurality of the authenticated electronic keys 20 used in the vehicle control system 1, timers dedicated to the plurality of electronic keys 20, respectively, may be provided.

When, in this process step, the polling control by the on-vehicle apparatus 10 has been performed and the time count of the continuation time period T for communication has been started, step S222 and subsequent steps are performed.

(Step S211)

In this process step, processing of responding, by the electronic key 20, to the polling control from the on-vehicle apparatus 10 is performed. Specifically, when the polling signal (first polling signal) has been received from the on-vehicle apparatus 10, the ACK signal that is the response signal is transmitted toward the on-vehicle apparatus 10, and, if the challenge signal has been received from the on-vehicle apparatus 10, the response signal is transmitted toward the on-vehicle apparatus 10. When the processing of responding to the polling control has been completed, the processing advances to step S212.

(Step S222)

In this process step, it is determined whether or not the electronic key 20 for which authentication has been verified in the on-vehicle apparatus 10 is present (has been detected). More specifically, when the ACK signal has been returned in response to the first polling signal transmitted from the on-vehicle apparatus 10 and challenge/response communication has been further performed, it is determined whether or not the electronic key 20 (herein after referred to as "first the electronic key 20_1") for which authentication has been verified in the on-vehicle apparatus 10 is present.

When, in this process step, it has been determined that the first electronic key 20_1 is present (S222, Yes), the processing advances to step S223. Meanwhile, when it has been determined that the first electronic key 20_1 is not present (S222, No), that is, when the on-vehicle apparatus 10 is not able to receive the ACK signal from the electronic key 20 or when authentication has not been verified although the on-vehicle apparatus 10 performed the challenge/response communication with the electronic key 20 that has received the ACK signal, the processing advances to step S224.

(Step S223)

Since, in this process step, the first electronic key 20_1 for which authentication has been verified in the on-vehicle apparatus 10 is present, the time count, of the continuation time period T, which has been started or has been made to continue in step S221 is still performed. Then, the processing advances to step S225.

(Step S224)

Since, in this process step, the first electronic key 20_1 for which authentication has been verified in the on-vehicle apparatus 10 is not present, the time count, of the continuation time period T, which has been started in step S221 is reset and the time count of the continuation time period T is started again anew. When the time count of the continuation time period T has been started again anew, the processing advances to step S227.

(Step S225)

In this process step, whether or not communication performed between the first electronic key 20_1 for which authentication has been verified in the above-described step S222 and the on-vehicle apparatus 10 is continued for not less than a predetermined time period Tref is determined by the on-vehicle apparatus 10. That is, it is determined whether or not the first electronic key 20_1 is staying for not less than the predetermined time period Tref in the detection range R. This determination can be made by whether or not the continuation time period T from start of time count in the above-described step S221 or S224 is not less than the predetermined time period Tref (T≥Tref).

When it has been determined that the above-described communication is continuously performed for not less than the predetermined time period Tref (S225, Yes), the processing advances to step S226. Meanwhile, when it has been determined that the above-described communication is not continuously performed for not less than the predetermined time period Tref (S225, No), the processing advances to step S227.

(Step S226)

In this process step, a setting change instruction is transmitted from the on-vehicle apparatus 10 toward the first electronic key 20_1 whose communication is continued for not less than the predetermined time period Tref such that return of the response signal in response to the reception of the first polling signal is prohibited. When a plurality of timers are provided so as to correspond to the plurality of electronic keys 20, the time count of the continuation time period T only for the first electronic key 20_1 to which the setting change instruction has been transmitted at this time may be ended. When the setting change instruction has been transmitted, the processing advances to step S227.

(Step S212)

In this process step, it is determined whether or not the first electronic key 20_1 has received the setting change instruction from the on-vehicle apparatus 10. When it is determined that the setting change instruction has been received (S212, Yes), the processing advances to step S213. Meanwhile, when it has been determined that the setting change instruction is not received (S212, No), the processing returns to step S211.

(Step S213)

In this process step, in accordance with the setting change instruction received from the on-vehicle apparatus 10, the first electronic key 20_1 restricts the response to the first polling signal. Specifically, the first electronic key 20_1 changes setting such that, even though the first polling signal to be used in the polling control has been received from the on-vehicle apparatus 10, the ACK signal is not returned to the on-vehicle apparatus 10. That is, the first electronic key 20_1 is prohibited from returning the response signal in response to the reception of the first polling signal transmitted from the on-vehicle apparatus 10. After the response prohibition processing, the processing is ended.

(Step S227)

In this process step, whether or not the vehicle control system 1 is in a situation to end the polling control is determined by the on-vehicle apparatus 10. A situation in which the polling control is to be ended refers to a situation in which the detection, based on polling, of the electronic key 20 being present outside the cabin of the vehicle becomes unnecessary, for example, a situation in which an operation of unlocking the door of the vehicle is performed.

When it has been determined that the polling control is to be ended (S227, Yes), the processing advances to step S228. Meanwhile, when it has been determined that the polling control is not to be ended (S227, No), the processing returns to the above-described step S221.

(Step S228)

In this process step, the timer is stopped, and the measurement (count) of the continuation time period T is ended. Therefore, the prohibition processing is ended.

Figure 4:
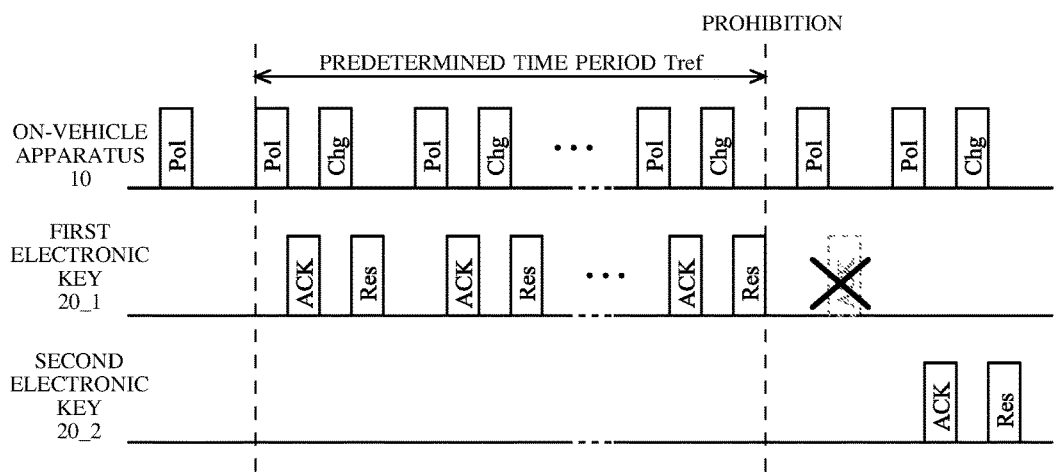
FIG. 4 is a timing chart showing an example of polling control performed in the prohibition processing A1.

FIG. 4 is a timing chart showing an example of the polling control performed in the specific example A1 of the prohibition processing. As shown in FIG. 4, when the continuation time period T in which the ACK signal (ACK) in response to the polling signal (Pol) transmitted from the on-vehicle apparatus 10 is returned from the first electronic key 20_1 and in which communication of the challenge signal (Chg)/the response signal (Res) is performed is not less than the predetermined time period Tref, the first electronic key 20_1 is prohibited from further responding to the reception of the polling signal (Pol).

Thus, the first electronic key 20_1 is not able to respond to the polling signal (Pol). Meanwhile, since another electronic key (second electronic key 20_2) is not prohibited from responding to the reception of the polling signal, polling control of the on-vehicle apparatus 10 can be performed for the other electronics key.

1-2. Specific example A2 of prohibition processing

The prohibition processing according to the specific example A2 shown in FIG. 3 is processing assumed for a system in which a plurality of polling signals, for example, two polling signals that are the first polling signal and the second polling signal different from the first polling signal can be used in polling. The on-vehicle apparatus 10 is able to transmit the first polling signal and the second polling signal, and the electronic key 20 is able to receive the first polling signal and the second polling signal.

The prohibition processing according to the specific example A2 is different from the prohibition processing according to the specific example A1 shown in FIG. 2 in steps S313, S321, S326, and S327. Hereinafter, regarding the prohibition processing according to the specific example A2, only a difference from the prohibition processing according to the specific example A1, that is, mainly the above-described steps S313, S321, S326, and S327, will be described.

(Step S321)

In this process step, the polling control by the on-vehicle apparatus 10 is performed. More specifically, the polling signal set from among the plurality of polling signals is transmitted from the on-vehicle apparatus 10 toward the detection range R, and the electronic key 20 is searched for within the detection range R. When the ACK signal has been received from any one of the electronic keys 20, the challenge signal is transmitted and the response signal in response thereto is received, so that the authentication processing is performed. In the specific example A2, the first polling signal is set as an initial signal after the start of processing.

In this process step, the time count of the continuation time period T by the on-vehicle apparatus 10 is started. When the time count of the continuation time period T has already been started, the time count is continued. The time count can be started by, for example, using a timer prepared in advance to reset and start the timer.

When, in this process step, the polling control by the on-vehicle apparatus 10 has been performed and the time count of the continuation time period T for communication has been started, step S222 and subsequent steps are performed.

(Step S326)

In this process step, a setting change instruction is transmitted from the on-vehicle apparatus 10 toward the first electronic key 20_1 whose communication is continued for not less than the predetermined time period Tref such that return of the response signal in response to the reception of a signal other than the first polling signal is prohibited. When a plurality of timers are provided so as to correspond to the plurality of electronic keys 20, only the time count of the continuation time period T for the first electronic key 20_1 to which the setting change instruction has been transmitted at this time may be ended. When the setting change instruction has been transmitted, the processing advances to step S327.

(Step S327)

In this process step, the first polling signal used in the polling control by the on-vehicle apparatus 10 is changed into a new polling signal to which the first electronic key 20_1 is not able to respond. In the specific example A2, the first polling signal is changed into the second polling signal. After the change processing for the polling signal, the processing advances to step S227.

(Step S313)

In this process step, in accordance with the setting change instruction received from the on-vehicle apparatus 10, the first electronic key 20_1 restricts the response in response to the polling signal. Specifically, the first electronic key 20_1 changes setting such that the ACK signal is returned to the on-vehicle apparatus 10 only when the first polling signal being presently used in polling has been received from the on-vehicle apparatus 10. That is, the first electronic key 20_1 is prohibited from returning the response signal in response to the reception of the second polling signal other than the first polling signal transmitted from the on-vehicle apparatus 10. After the response prohibition processing, the processing is ended.

Figure 5:
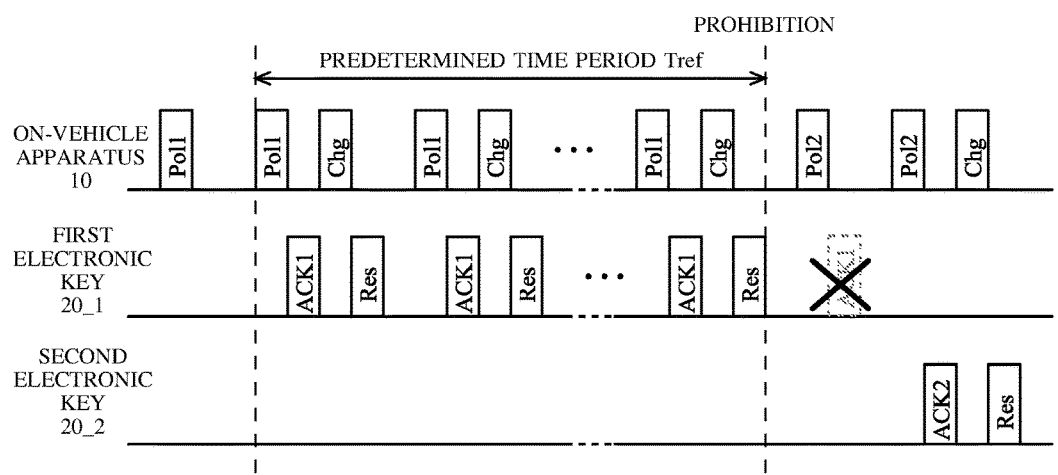
FIG. 5 is a timing chart showing an example of polling control achieved in the prohibition processing A2.

FIG. 5 is a timing chart showing an example of the polling control performed in the specific example A2 of the prohibition processing. As shown in FIG. 5, when the continuation time period T in which the ACK signal (ACK1) in response to the first polling signal (Pol1) transmitted from the on-vehicle apparatus 10 is returned from the first electronic key 20_1 and in which communication of the challenge signal (Chg)/the response signal (Res) is performed is not less than the predetermined time period Tref, the first electronic key 20_1 is prohibited from further responding to the reception of a signal other than the first polling signal (Pol1), and the signal transmitted from the on-vehicle apparatus 10 is changed into the second polling signal (Pol2).

Thus, the first electronic key 20_1 is not able to respond to the second polling signal (Pol2). Meanwhile, since another second electronic key 20_2 is not prohibited from responding to the reception of a signal other than the first polling signal (Pol1), polling control, of the on-vehicle apparatus 10, using the second polling signal (Pol2), can be performed for the other second electronic key 20_2.

Second Embodiment

In a vehicle control system 1 according to a second embodiment, the electronic key 20 determines the continuation time period for communication with the on-vehicle apparatus 10, and the electronic key 20 itself performs prohibition of return of the response signal in response to the polling signal. Hereinafter, a difference of the second embodiment from the first embodiment will be described, and description of the same contents as in the first embodiment will be omitted as appropriate.

There is a difference in that the processing of determining whether or not the communication performed with the first electronic key 20_1 for which authentication has been verified in the on-vehicle apparatus 10 is continued for not less than a predetermined time period (corresponding to determination section in claim 1) and the processing of restricting a response, in response of the polling signal, of the first electronic key 20_1 whose communication is continued for not less than a predetermined time period (corresponding to first processing section according to claims 1 to 3), both performed by the vehicle control section 13 of the on-vehicle apparatus 10 in the above-described first embodiment, are performed by the first electronic key 20_1 in the second embodiment.

<Control by Vehicle Control System>

Figure 6:
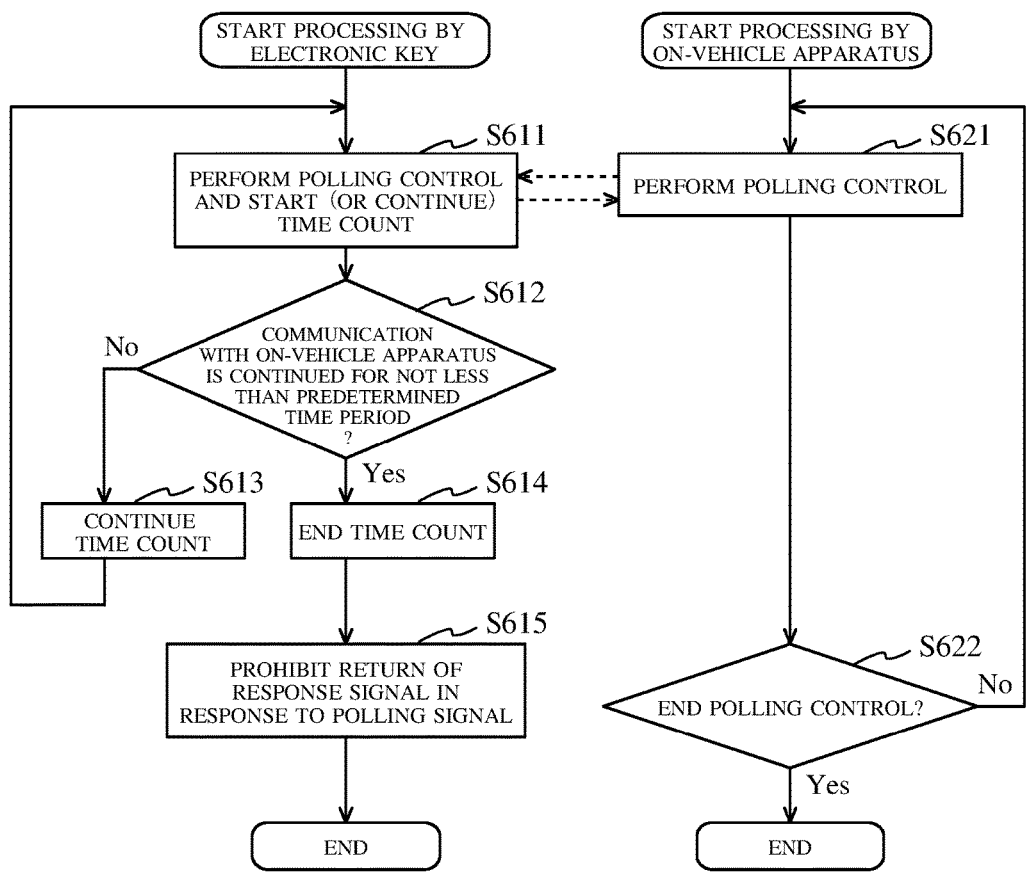
FIG. 6 is a flowchart showing a procedure of prohibition processing A3 preformed by the vehicle control system.
Figure 7:
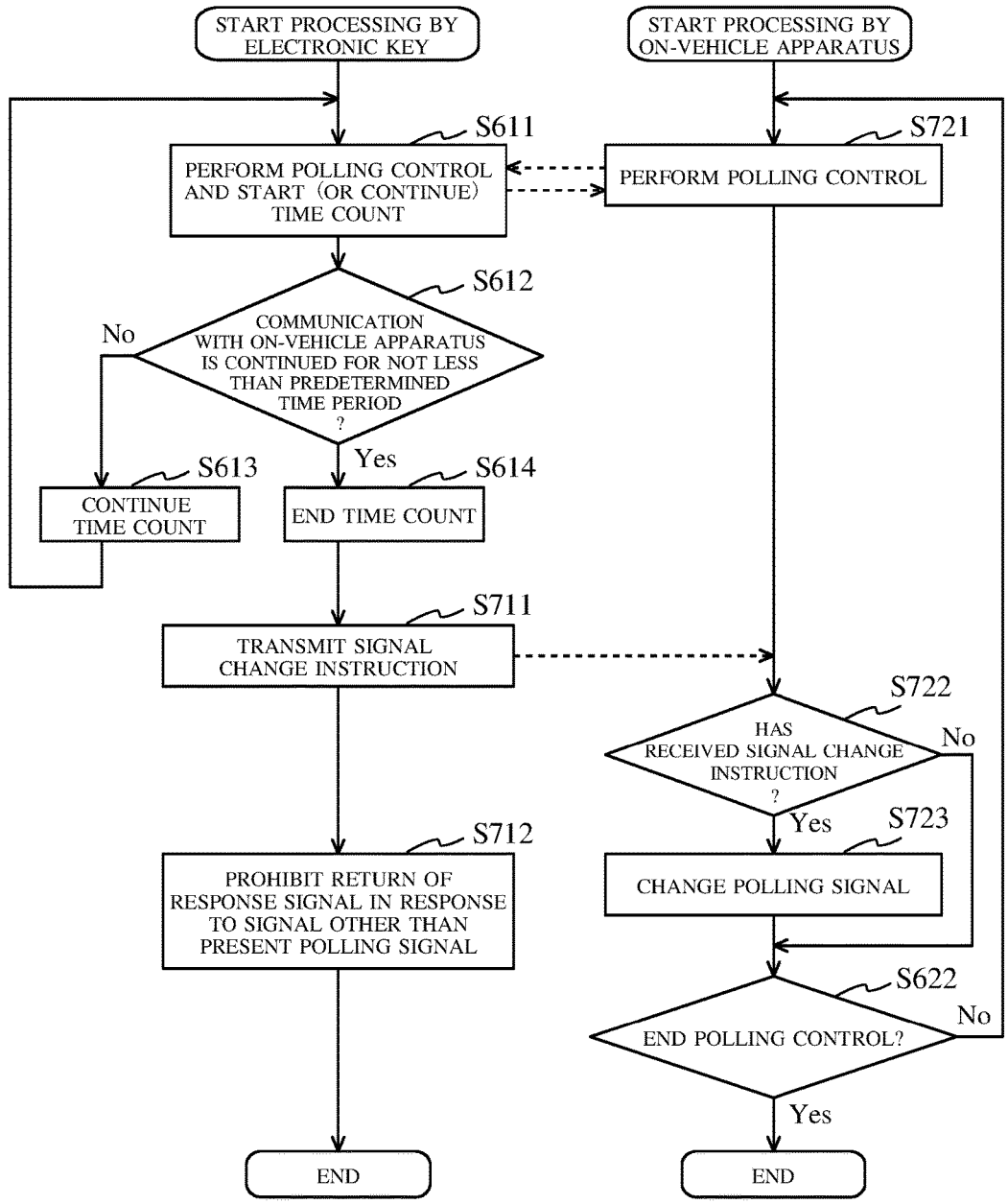
FIG. 7 is a flowchart showing a procedure of prohibition processing A4 performed by the vehicle control system.

FIG. 6 is a flowchart showing a procedure of a specific example A3 of the prohibition processing performed between the on-vehicle apparatus 10 and the electronic key 20 in the vehicle control system 1 according to the second embodiment. FIG. 7 is a flowchart showing a procedure of a specific example A4 of the prohibition processing performed between the on-vehicle apparatus 10 and the electronic key 20 in the vehicle control system 1 according to the second embodiment.

2-1. Specific Example A3 of Prohibition Processing

The prohibition processing according to the specific example A3 shown in FIG. 6 is processing assumed for a system in which only one the polling signal (e.g., only first polling signal) can be used in polling. It is possible to apply the prohibition processing to the case where, even in a system in which a plurality of polling signals (e.g., two polling signals that are first polling signal and second polling signal) can be used in the polling control, only either one of the polling signals is used.

In the prohibition processing according to the specific example A3, in a case where, for example, since the door of the vehicle is locked, or the detection, based on polling, of the electronic key 20 being present outside the cabin of the vehicle has become necessary, a process step of step S621 in the on-vehicle apparatus 10 is started.

(Step S621)

In this process step, the polling control by the on-vehicle apparatus 10 is performed. When the ACK signal has been received from any one of the electronic keys 20, the challenge signal is transmitted and the response signal in response thereto is received, so that the authentication processing is performed. In the specific example A3, the first polling signal is transmitted from the on-vehicle apparatus 10. When the polling control by the on-vehicle apparatus 10 has been performed, the processing advances to step S622.

(Step S611)

In this process step, processing of responding, by the first electronic key 20_1, to the polling control from the on-vehicle apparatus 10 is performed. Specifically, when the polling signal (first polling signal) has been received from the on-vehicle apparatus 10, the ACK signal that is the response signal is transmitted toward the on-vehicle apparatus 10, and, if the challenge signal has been received from the on-vehicle apparatus 10, the response signal is transmitted toward the on-vehicle apparatus 10. When the processing of responding to the polling control has been completed, the processing advances to step S612.

In this process step, the time count of the continuation time period T by the first electronic key 20_1 is started. When the time count of the continuation time period T has already been started, the time count is continued. The time count can be started by, for example, using a timer prepared in advance to reset and start the timer. When the processing of responding to the polling control has been completed and the time count of the continuation time period T has been started, the processing advances to step S612.

(Step S612)

In this process step, it is determined whether or not communication performed with the on-vehicle apparatus 10 is continued for not less than the predetermined time period Tref, on the basis of the first electronic key 20_1. That is, it is determined whether or not the first electronic key 20_1 is staying for not less than the predetermined time period Tref in the detection range R. This determination can be made by whether or not the continuation time period T from start of time count in the above-described step S611 is not less than the predetermined time period Tref (T≥Tref).

When it has been determined that the above-described communication is continuously performed for not less than the predetermined time period Tref (S612, Yes), the processing advances to step S614. Meanwhile, when it has been determined that the above-described communication is not continuously performed for not less than the predetermined time period Tref (S612, No), the processing advances to step S613.

(Step S613)

In this process step, since communication performed between the first electronic key 20_1 and the on-vehicle apparatus 10 is not continued for not less than the predetermined time period Tref, the time count, of the continuation time period T, which has been started in step S611 or is continued is continued. Then, the processing returns to step S611.

(Step S614)

Since, in this process step, communication performed between the first electronic key 20_1 and the on-vehicle apparatus 10 is continued for not less than the predetermined time period Tref, the time count, of the continuation time period T, which has been started in step S611 or is continued is ended. Then, the processing advances to step S615.

(Step S615)

In this process step, the first electronic key 20_1 restricts the response in response to the first polling signal. Specifically, the first electronic key 20_1 changes setting such that, even though the first polling signal to be used in the polling control has been received from the on-vehicle apparatus 10, the ACK signal is not returned to the on-vehicle apparatus 10. That is, the first electronic key 20_1 is prohibited from returning the response signal in response to the reception of the first polling signal transmitted from the on-vehicle apparatus 10. After the response prohibition processing, the processing is ended.

(Step S622)

In this process step, whether or not the vehicle control system 1 is in a situation to end the polling control is determined in the on-vehicle apparatus 10. A situation in which the polling control is to be ended refers to a situation in which an operation in which the detection, based on polling, of the electronic key 20 being present outside the cabin of the vehicle becomes unnecessary, for example, a situation in which an operation of unlocking the door of the vehicle is performed.

2-2. Specific Example A4 of Prohibition Processing

The prohibition processing according to the specific example A4 shown in FIG. 7 is processing assumed for a system in which a plurality of polling signals (e.g., two polling signals that are first polling signal and second polling signal) can be used in polling.

The prohibition processing according to the specific example A4 is different from the prohibition processing according to the specific example A3 shown in FIG. 6 in steps S711, S712, S721, S722, and S723. Hereinafter, regarding the prohibition processing according to the specific example A4, only a difference from the prohibition processing according to the specific example A3, that is, mainly the above-described steps S711, S712, S721, S722, and S723, will be described.

(Step S721)

In this process step, the polling control by the on-vehicle apparatus 10 is performed. More specifically, the polling signal set from among the plurality of polling signals is transmitted from the on-vehicle apparatus 10 toward the detection range R, and the electronic key 20 is searched for within the detection range R. When the ACK signal has been received from any one of the electronic keys 20, the challenge signal is transmitted and the response signal in response thereto is received, so that the authentication processing is performed. In the specific example A4, the first polling signal is set as an initial signal after the start of processing. When the polling control by the on-vehicle apparatus 10 has been performed, step S722 and subsequent steps are performed.

(Step S711)

In this process step, a signal change instruction is transmitted from the first electronic key 20_1 toward the on-vehicle apparatus 10 whose communication is continued for not less than the predetermined time period Tref such that the signal to be used in polling is changed from the present first polling signal to a new polling signal (second polling signal). When the signal change instruction has been transmitted, the processing advances to step S712.

(Step S712)

In this process step, the first electronic key 20_1 restricts the response in response to the polling signal. Specifically, the first electronic key 20_1 changes setting such that the ACK signal is returned to the on-vehicle apparatus 10 only when the first polling signal being presently used in polling has been received from the on-vehicle apparatus 10. That is, the first electronic key 20_1 is prohibited from returning the response signal in response to the reception of the second polling signal other than the first polling signal transmitted from the on-vehicle apparatus 10. After the response prohibition processing, the processing is ended.

(Step S722)

In this process step, it is determined whether or not the on-vehicle apparatus 10 has received the signal change instruction from the first electronic key 20_1. When it is determined that the signal change instruction has been received (S722, Yes), the processing advances to step S723. Meanwhile, when it has been determined that the signal change instruction is not received (S722, No), the processing advances to step S622.

(Step S723)

In this process step, the on-vehicle apparatus 10 changes, in accordance with the signal change instruction received from the first electronic key 20_1, the first polling signal to be used in the polling control into a new polling signal to which the first electronic key 20_1 is not able to respond. In the specific example A4, the first polling signal is changed into the second polling signal. After the change processing for the polling signal, the processing advances to step S622.

Third Embodiment

In a vehicle control system 1 according to a third embodiment, prohibition of the electronic key 20 in the prohibition state from returning a response signal is cancelled on the basis of presence or absence of a user's operation on the on-vehicle apparatus 10 from the electronic key 20 which is prohibited from returning the response signal. Hereinafter, a difference of the third embodiment from the first embodiment will be described, and description of the same contents as in the first embodiment will be omitted as appropriate.

The vehicle control section 13 of the on-vehicle apparatus 10 performs the authentication processing for the electronic key 20 on the basis of a user's predetermined operation (corresponding to first authentication section in claim 4). The vehicle control section 13 of the on-vehicle apparatus 10 performs processing for cancelling the prohibition state of the electronic key 20 which is prohibited from responding to reception of the polling signal (corresponding to second processing section in claim 4).

<Control by Vehicle Control System>

Figure 8:
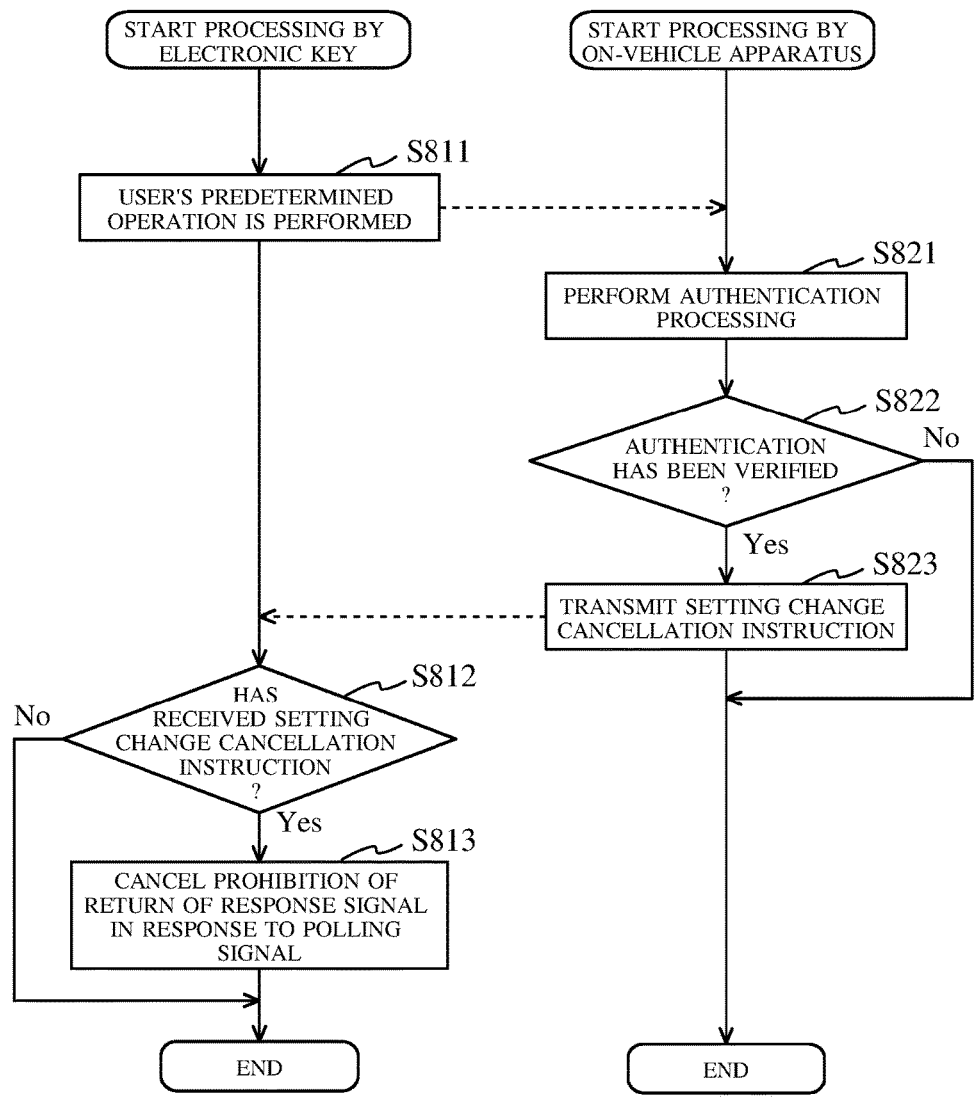
FIG. 8 is a flowchart showing a procedure of cancellation processing B1 performed by the vehicle control system.

FIG. 8 is a flowchart showing a procedure of a specific example B1 of cancellation processing performed between the on-vehicle apparatus 10 and the electronic key 20 in the vehicle control system 1 according to the third embodiment.

3-1. Specific Example B1 of Cancellation Processing

The cancellation processing according to the specific example B1 shown in FIG. 8 is processing for cancelling the prohibition state of the electronic key 20 which is prohibited, in the prohibition processing according to the above-described specific example A1 or A3, from returning the response signal in response to reception of the polling signal.

In the cancellation processing according to the specific example B1, when the user's predetermined operation is performed using the electronic key 20 (hereinafter, referred to as "first electronic key 20_1") which is prohibited from returning the response signal in response to the on-vehicle apparatus 10, a process step of step S811 is started.

(Step S811)

In this process step, as the user's predetermined operation, short-range radio communication using the first electronic key 20_1 is performed. The short-range radio communication refers to two-way communication using the same frequency. For example, the short-range radio communication includes transponder communication, near field communication (NFC), and so on in which, when the first electronic key 20_1 has been oriented toward a predetermined place, such as an engine start switch (not illustrated), in the vehicle 2 or when an operation switch (not illustrated), for door locking and unlocking or the like, which is provided on the first electronic key 20_1 has been depressed, the transmission and reception of a signal between the on-vehicle apparatus 10 and the first electronic key 20_1 is performed. When, in this process step, the user's predetermined operation has been performed, the processing advances to step S812.

(Step S821)

In this process step, the authentication processing is performed between the first electronic key 20_1 and the on-vehicle apparatus 10 that have executed the user's predetermined operation, that is, short-range radio communication. Then, the processing advances to step S822.

(Step S822)

In this process step, it is determined whether or not authentication between the first electronic key 20_1 and the on-vehicle apparatus 10 has been verified. When it is determined that authentication for the first electronic key 20_1 has been verified (S822, Yes), the processing advances to step S823. Meanwhile, when it has been determined that authentication for the first electronic key 20_1 is not verified (S822, No), the cancellation processing is ended.

(Step S823)

In this process step, a setting change cancellation instruction is transmitted from the on-vehicle apparatus 10 toward the first electronic key 20_1 such that the prohibition state of the first electronic key 20_1 which is inhibited from responding to reception of the first polling signal is canceled. When the setting change cancellation instruction has been transmitted, the cancellation processing is ended.

(Step S812)

In this process step, it is determined whether or not the first electronic key 20_1 has received the setting change cancellation instruction from the on-vehicle apparatus 10. When it is determined that the setting change cancellation instruction has been received (S812, Yes), the processing advances to step S813. Meanwhile, when it has been determined that the setting change cancellation instruction is not received (S812, No), the cancellation processing is ended.

(Step S813)

In this process step, in accordance with the setting change cancellation instruction received from the on-vehicle apparatus 10, the first electronic key 20_1 cancels the prohibition of return of the response signal in response to the polling signal. Specifically, the first electronic key 20_1 changes setting (returns to original state) such that the ACK signal can be returned to the on-vehicle apparatus 10, when receiving the first polling signal to be used in the polling control from the on-vehicle apparatus 10. Thus, the cancellation processing is ended.

In the process step of the above-described step S823, it is possible to make notification that authentication between the first electronic key 20_1 and the on-vehicle apparatus 10 has been verified, instead of transmission of the setting change cancellation instruction from the on-vehicle apparatus 10 toward the first electronic key 20_1. The first electronic key 20_1 is able to determine that the notification has been received from the on-vehicle apparatus 10 that authentication has been verified, and is able to perform the above-described step S813.

Fourth Embodiment

In a vehicle control system 1 according to a fourth embodiment, prohibition of the electronic key 20 in the prohibition state from returning a response signal is cancelled on the basis of presence or absence of a user's operation on the on-vehicle apparatus 10 from any one of the electronic keys 20. Hereinafter, a difference of the fourth embodiment from the third embodiment will be described, and description of the same contents as in the third embodiment will be omitted as appropriate.

The vehicle control section 13 of the on-vehicle apparatus 10 performs the authentication processing for the electronic key 20 on the basis of a user's predetermined operation (corresponding to first authentication section and second authentication section in claim 5). The vehicle control section 13 of the on-vehicle apparatus 10 performs the processing for cancelling the prohibition state of the electronic key 20 which is prohibited from responding to reception of the polling signal (corresponding to second processing section in claim 5).

<Control by Vehicle Control System>

Figure 9:
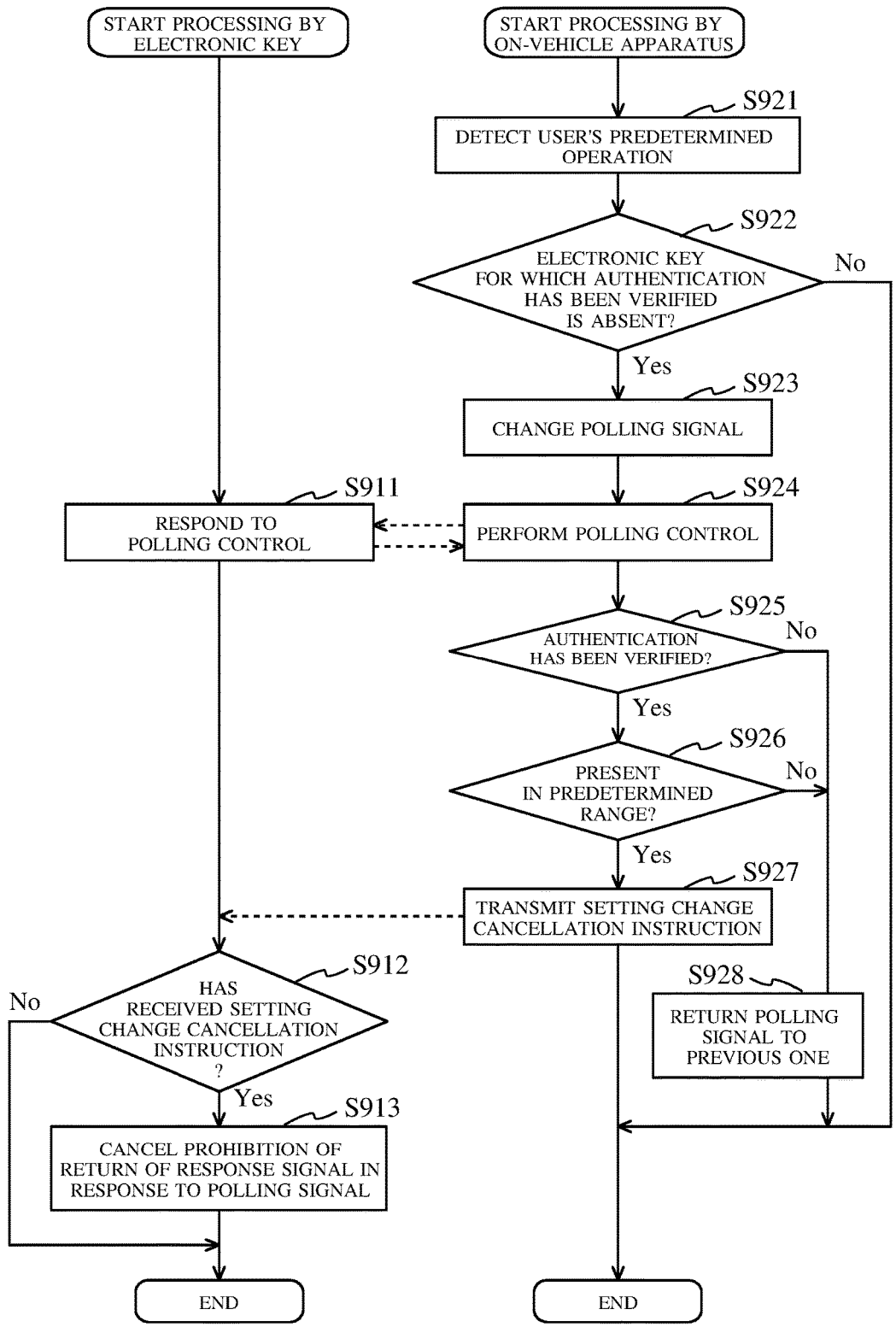
FIG. 9 is a flowchart showing a procedure of cancellation processing B2 performed by the vehicle control system.

FIG. 9 is a flowchart showing a procedure of a specific example B2 of the cancellation processing performed between the on-vehicle apparatus 10 and the electronic key 20 in the vehicle control system 1 according to the fourth embodiment.

4-1. Specific Example B2 of Cancellation Processing

The cancellation processing according to the specific example B2 shown in FIG. 9 is processing for cancelling the prohibition state of the electronic key 20 which is prohibited, in the prohibition processing according to the above-described specific example A2 or A4, from returning the response signal in response to reception of the polling signal (e.g., second polling signal other than first polling signal).

In the cancellation processing according to the specific example B2, when the user's predetermined operation on the on-vehicle apparatus 10 is performed using the electronic key 20 (hereinafter, referred to as "first electronic key 20_1") which is prohibited from returning the response signal or another electronic key 20 (hereinafter, referred to as "second electronic key 20_2") other than the first electronic key 20_1, a process step of step S921 is started.

(Step S921)

In this process step, a predetermined operation performed by the electronic key 20 is detected and the authentication processing between the electronic key 20 and the on-vehicle apparatus 10 is performed. The predetermined operation includes, for example, the user's operations such as contact with a door handle and depressing the engine start switch (not illustrated), the polling control and short-range radio communication that are performed between the second electronic key 20_2 and the on-vehicle apparatus 10, and the like. When, in this process step, a predetermined operation has been detected and the authentication processing is been performed, the processing advances to step S922.

(Step S922)

In this process step, it is determined whether or not the electronic key 20 for which authentication has been verified in the on-vehicle apparatus 10 is absent. When it is determined that the electronic key 20 for which authentication has been verified in the on-vehicle apparatus 10 is not present (S922, Yes), the processing advances to step S923. Meanwhile, when it is determined that the electronic key 20 for which authentication has been verified in the on-vehicle apparatus 10 is present (S922, No), it is determined that prohibition state of the first electronic key 20_1 which is prohibited from responding to the polling signal is not to be cancelled, so that the cancellation processing is ended.

(Step S923)

In this process step, the polling signal to be used in polling is changed. In the specific example B2, the second polling signal which is the present polling signal and to which the first electronic key 20_1 is prohibited from responding is changed into the first polling signal to which the first electronic key 20_1 is not prohibited from responding. Then, the processing advances to step S924.

(Step S924)

In this process step, the polling control by the on-vehicle apparatus 10 is performed. In the specific example B2, the polling control using the first polling signal is performed. In the polling control, a signal that allows the estimation of a position of the electronic key 20 is used. For example, the signal includes a signal (radio wave) in which an intensity thereof is changed in accordance with a distance from the vehicle 2 (inside cabin/outside cabin), and the like. When the polling control using the first polling signal having been changed by the on-vehicle apparatus 10 has been performed, step S925 and subsequent steps are performed.

(Step S911)

In this process step, processing of responding, by the first electronic key 20_1, to the polling control from the on-vehicle apparatus 10 is performed. Specifically, when the polling signal (first polling signal) has been received from the on-vehicle apparatus 10, the ACK signal that is the response signal is transmitted toward the on-vehicle apparatus 10, and, if the challenge signal has been received from the on-vehicle apparatus 10, the response signal is transmitted toward the on-vehicle apparatus 10. When the processing of responding to the polling control has been completed, the processing advances to step S912.

(Step S925)

In this process step, it is determined whether or not the first electronic key 20_1 for which authentication has been verified in the on-vehicle apparatus 10 is present. When it is determined that the first electronic key 20_1 for which authentication has been verified in the on-vehicle apparatus 10 is present (S925, Yes), the processing advances to step S926. Meanwhile, when it is determined that the first electronic key 20_1 for which authentication has been verified in the on-vehicle apparatus 10 is not present (S925, No), the processing advances to step S928.

(Step S926)

In this process step, it is determined whether or not the first electronic key 20_1 for which authentication has been verified in the on-vehicle apparatus 10 is present in a predetermined range. When it has been determined that the first electronic key 20_1 is present in the predetermined range (S926, Yes), the processing advances to step S927. Meanwhile, it has been determined that the first electronic key 20_1 is not in the predetermined range (S926, No), the processing advances to step S928.

The above-described predetermined range may be the same as the detection range R at which the polling signal transmitted from the above-described on-vehicle apparatus 10 arrives and may be an area smaller than the detection range R. The predetermined range may be an area in the cabin of the vehicle. How far the position of the electronic key 20 is away from the vehicle 2 can be estimated from, for example, the intensity of a signal (radio wave) that the electronic key 20 has received from the on-vehicle apparatus 10.

(Step S927)

In this process step, the setting change cancellation instruction is transmitted from the on-vehicle apparatus 10 toward the first electronic key 20_1 such that the prohibition state of the first electronic key 20_1 which is prohibited from responding to reception of the first polling signal is prohibited is cancelled. When the setting change cancellation instruction has been transmitted, the cancellation processing is ended.

(Step S928)

Since, in this process step, the first electronic key 20_1 for which prohibition of responding to the polling signal is cancelled is absent, the polling signal having been changed in the above-described step S923 is returned to the previous one. In the specific example B2, the first polling signal is changed into the second polling signal that has prohibited the first electronic key 20_1 from responding. Then, the cancellation processing is ended.

(Step S912)

In this process step, it is determined whether or not the first electronic key 20_1 has received the setting change cancellation instruction from the on-vehicle apparatus 10. When it is determined that the setting change cancellation instruction has been received (S912, Yes), the processing advances to step S913. Meanwhile, when it has been determined that the setting change cancellation instruction is not received (S912, No), the cancellation processing is ended.

(Step S913)

In this process step, in accordance with the setting change cancellation instruction received from the on-vehicle apparatus 10, the first electronic key 20_1 cancels the prohibition of return of the response signal in response to the polling signal. Specifically, when the polling signal (e.g., second polling signal) other than the first polling signal from the on-vehicle apparatus 10 has been received, setting is changed (returns to original state) such that the ACK signal can be returned to the on-vehicle apparatus 10. Then, the cancellation processing is ended.

Fifth Embodiment

In a vehicle control system 1 according to a fifth embodiment, prohibition of the electronic key 20 in the prohibition state from returning the response signal is cancelled on the basis of presence or absence of a user's operation on the on-vehicle apparatus 10 from any one of the electronic keys 20. Hereinafter, a difference of the fifth embodiment from the fourth embodiment will be described, and description of the same contents as in the fourth embodiment will be omitted as appropriate.

The vehicle control section 13 of the on-vehicle apparatus 10 performs the authentication processing for the electronic key 20 on the basis of a user's predetermined operation (corresponding to first authentication section and second authentication section in claim 5). The key control section 23 of the electronic key 20 performs the processing for cancelling the prohibition state of the electronic key 20 which is prohibited from responding to reception of the polling signal (corresponding to second processing section in claim 5).

<Control by Vehicle Control System>

Figure 10:
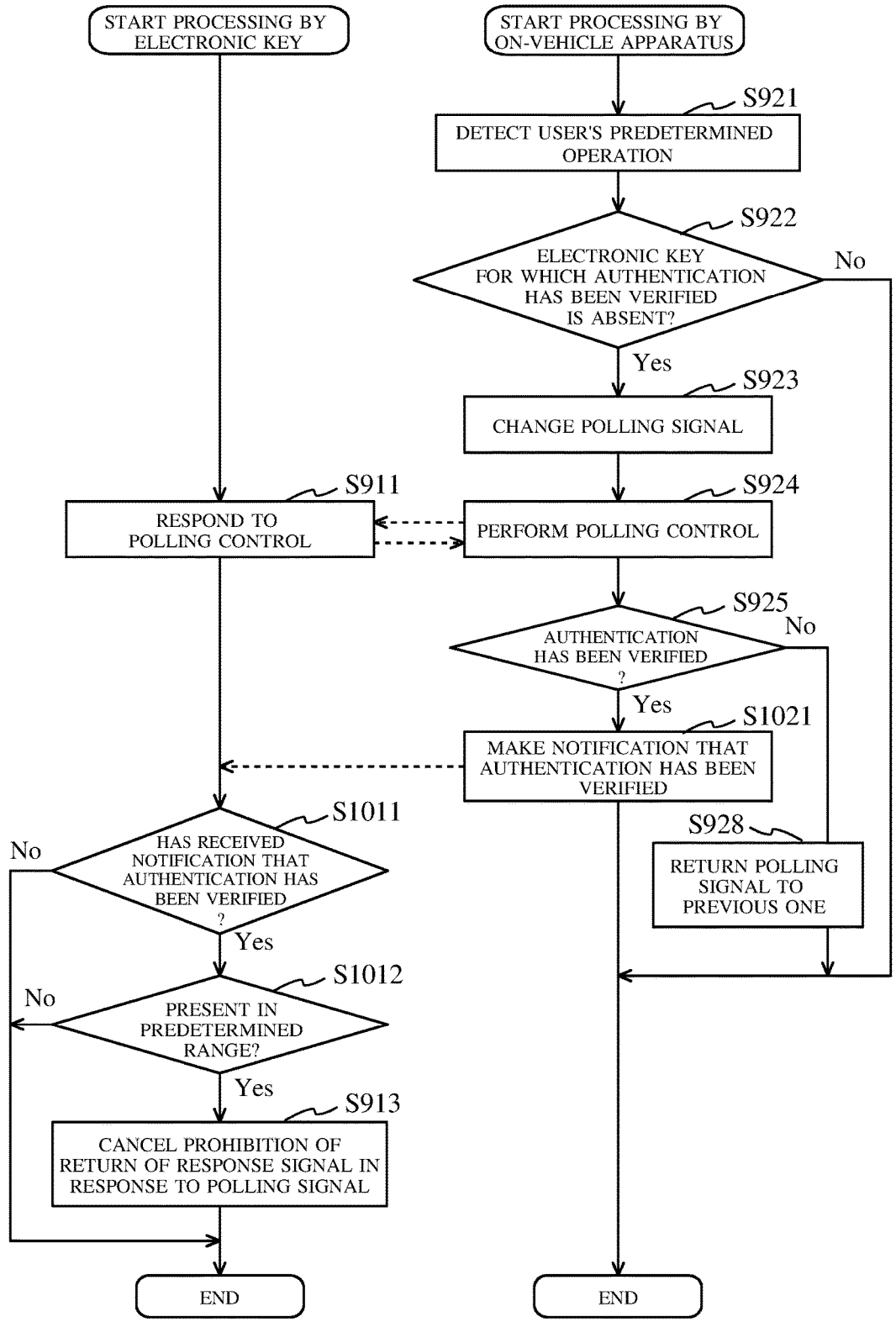
FIG. 10 is a flowchart showing a procedure of cancellation processing B3 performed by the vehicle control system.

FIG. 10 is a flowchart showing a procedure of a specific example B3 of the cancellation processing performed between the on-vehicle apparatus 10 and the electronic key 20 in the vehicle control system 1 according to the fifth embodiment.

5-1. Specific Example B3 of Cancellation Processing

The cancellation processing according to the specific example B3 shown in FIG. 10 is processing for cancelling the prohibition state of the electronic key 20 which is prohibited, in the prohibition processing according to the above-described specific examples A2 and A4, from returning the response signal in response to reception of the polling signal (e.g., second polling signal other than first polling signal).

The prohibition processing according to the specific example B3 is different from the prohibition processing according to the specific example B2 shown in FIG. 9 in steps S1011, S1012, and S1021. Hereinafter, regarding the prohibition processing according to the specific example B3, only a difference from the prohibition processing according to the specific example B2, that is, mainly the above-described steps S1011, S1012, and S1021, will be described.

(Step S1021)

In this process step, notification that authentication between the first electronic key 20_1 and the on-vehicle apparatus 10 has been verified is made from the on-vehicle apparatus 10 toward the first electronic key 20_1. When notification is made that the authentication has been verified, the cancellation processing is ended.

(Step S1011)

In this process step, it is determined whether or not the first electronic key 20_1 has received the notification from the on-vehicle apparatus 10 that authentication has been verified. When it is determined that the notification is received that authentication has been verified (S1011, Yes), the processing advances to step S1012. Meanwhile, when it has been determined that the notification is not received that authentication has been verified (S1011, No), the cancellation processing is ended.

(Step S1012)

In this process step, it is determined whether or not the first electronic key 20_1 is present in a predetermined range. When it has been determined that the first electronic key 20_1 is present in the predetermined range (S1012, Yes), the processing advances to step S913. Meanwhile, when it has been determined that the first electronic key 20_1 is not present in the predetermined range (S1012, No), the cancellation processing is ended. The predetermined range is as described above. Whether or not the first electronic key 20_1 is present in the predetermined range can be determined on the basis of the intensity of a signal (radio wave) received from the on-vehicle apparatus 10, or the like.

Functions and Effects of the Present Embodiment

In the above-described vehicle control system 1 according to the present invention, it is determined that the first electronic key 20_1 is staying for not less than the predetermined time period Tref in the detection range R of the on-vehicle apparatus 10, on the basis of the continuation time period T for communication performed between the on-vehicle apparatus 10 and the first electronic key 20_1. When it has been determined that the communication is continued for not less than the predetermined time period Tref, the response, by the first electronic key 20_1, in response to the polling signal between the on-vehicle apparatus 10 and the first electronic key 20_1 staying in the detection range R is restricted.

More specifically, in the system in which only one polling signal can be used in polling, the response, by the first electronic key 20_1, in response to the polling signal is restricted such that, even though receiving the first polling signal from the on-vehicle apparatus 10, the first electronic key 20_1 staying in the detection range R does not return the ACK signal.

Alternatively, in the system in which the plurality of polling signals can be used in polling, the response, by the first electronic key 20_1, in response to the polling signal is restricted such that the signal to be transmitted from the on-vehicle apparatus 10 is changed from the first polling signal to the second polling signal, and such that, even though receiving, from the on-vehicle apparatus 10, the second polling signal that is a signal other than the first polling signal, the first electronic key 20_1 staying in the detection range R does not return the ACK signal.

In this control, it is possible to avoid a situation in which communication between the on-vehicle apparatus 10 and the first electronic key 20_1 has been continuously performed for not less than the predetermined time period Tref. Therefore, in the first electronic key 20_1, it is possible to suppress current consumption necessary for communication (transmission of ACK signal, reception of challenge signal, transmission of response signal, etc.) with the on-vehicle apparatus 10. Meanwhile, in the on-vehicle apparatus 10, it is possible to suppress current consumption necessary for communication (reception of ACK signal, transmission of challenge signal, reception of response signal, authentication processing, etc.) with the first electronic key 20_1.

Since, in the vehicle control system 1 according to the present invention, communication performed only between the on-vehicle apparatus 10 and the first electronic key 20 staying in the detection range R is restricted, the on-vehicle apparatus 10 is able to perform communication, using the first polling signal, with the second electronic key 20_2 other than the first electronic key 20_1. Thus, it is possible to avoid a situation of degrading the user's convenience, such a situation that, for example, the vehicle 2 cannot be operated by the second electronic key 20_2 although the second electronic key 20_2 is authenticated.

In this control, it is possible to operate the vehicle by the authenticated second electronic key 20_2 while it is possible to prohibit the response by the first electronic key 20_1 continuously staying for the predetermined time period Tref in the detection range R of the on-vehicle apparatus 10. Therefore, it is possible to suppress current consumption in the first electronic key 20_1 and the on-vehicle apparatus 10 without degrading the user's convenience.

Further, in the vehicle control system 1 according to the present invention, when the user's predetermined operation has been performed, prohibition of the first electronic key 20_1 being present (staying) in the detection range R and being in the prohibition state from returning the response signal to the polling signal is cancelled.

More specifically, in the system in which only one polling signal can be used in polling, when the predetermined operation (e.g., execution of short-range radio communication) performed on the on-vehicle apparatus 10 from the first electronic key 20_1 being present (staying) in the detection range R of the on-vehicle apparatus 10 has been detected and authentication for the first electronic key 20_1 has been verified, prohibition of the first electronic key 20_1 in the prohibition state from returning the response signal is cancelled.

Alternatively, in the system in which the plurality of polling signals can be used in polling, when the predetermined operation using any one of the electronic keys 20 has been detected and authentication between the on-vehicle apparatus 10 and the electronic key 20 is not verified, polling is performed using the first polling signal in response to which the first electronic key 20_1 is not inhibited from returning the response signal. When authentication for the first electronic key 20_1 being present (staying) in the predetermined range (detection range R or another range) has been verified by the polling control using the first polling signal, the prohibition of the first electronic key 20_1 in the prohibition state from returning a response signal is cancelled.

In this control, in the system in which only one polling signal can be used in the polling control and in the system in which a plurality of polling signals can be used in polling, it is possible to avoid such a situation that, for example, the first electronic key 20_1 being present (staying) in the detection range R cannot be used for an indefinite time period and it is possible to suppress degradation of the user's convenience.

Figure 11:
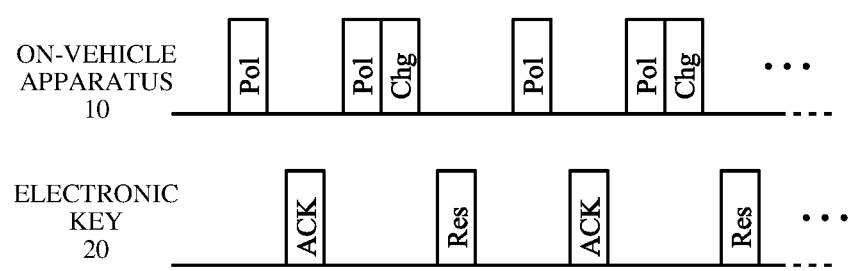
FIG. 11 is a timing chart showing an example of another polling control.

As shown in FIGS. 4 and 5, the vehicle control system 1 to which the present invention is applied is not limited to a system that performs the polling control in a communication format which does not require the polling signal (wake signal) when the challenge signal is transmitted. For example, as shown in FIG. 11, the vehicle control system 1 may be a system that performs the polling control in a communication format which necessarily requires the polling signal (wake signal) when the challenge signal is transmitted.

The vehicle control section 13 and/or the key control section 23 as described above may be typically formed as an electronic control unit (ECU) that includes, for example, a central processing unit (CPU), a memory, and an input/output interface. The ECU performs a predetermined function by causing the CPU to read a predetermined program stored in the memory and execute the program.

While the invention has been described in detail, the foregoing description is in all aspects illustrative and not restrictive. It will be understood that numerous other modifications and variations can be devised without departing from the scope of the invention.

What is claimed is:

1. A vehicle control system that performs detection and authentication of an electronic key being present in a detection range on a periphery of a vehicle, on the basis of polling performed by an on-vehicle apparatus, the vehicle control system being included in at least one of the on-vehicle apparatus and a first electronic key, the vehicle control system comprising:

a determination section configured to determine, after the first electronic key is authenticated, whether or not communication between the on-vehicle apparatus and the first electronic key, in which the first electronic key returns a signal in response to a signal transmitted from the on-vehicle apparatus, is continuously performed for more than or equal to a predetermined time period such that an exchange of signals between the on-vehicle apparatus and the first electronic key is performed for more than or equal to the predetermined time period; and a first processing section configured to restrict a response by the first electronic key to a first polling signal transmitted from the on-vehicle apparatus, when the determination section has determined that the communication is continuously performed for more than or equal to the predetermined time period, wherein:

the on-vehicle apparatus is able to transmit a second polling signal different from the first polling signal;

the first electronic key is able to receive the second polling signal; and the first processing section restricts the response by the first electronic key by (i) changing the first polling signal transmitted from the on-vehicle apparatus into the second polling signal; and (ii) prohibiting the first electronic key from returning a response signal in response to reception of a signal other than the first polling signal.

2. The vehicle control system according to claim 1, wherein:
the first processing section restricts the response by the first electronic key by prohibiting the first electronic key from returning a response signal in response to reception of the first polling signal transmitted from the on-vehicle apparatus, when the determination section has determined that the communication is continuously performed for more than or equal to the predetermined time period.

3. The vehicle control system according to claim 2, wherein:
the on-vehicle apparatus comprises a first authentication section configured to perform authentication processing for the first electronic key, on the basis of a user's predetermined operation using the first electronic key; and
the vehicle control system included in at least one of the on-vehicle apparatus and the first electronic key further comprises a second processing section configured to cancel prohibition of the first electronic key from returning the response signal in response to the first polling signal, when the first authentication section has determined that authentication for the first electronic key has been verified.

4. The vehicle control system according to claim 1, wherein:
the on-vehicle apparatus comprises:
a first authentication section configured to perform authentication processing for the electronic key, on the basis of a user's predetermined operation using the first electronic key or a second electronic key different from the first electronic key; and
a second authentication section configured to:
(i) change a signal to be transmitted from the on-vehicle apparatus from the second polling signal to the first polling signal; and
(ii) perform detection and authentication processing for the first electronic key, when the first authentication section has determined that the first electronic key and the second electronic key for which authentication has been verified are not present; and
the vehicle control system included in at least one of the on-vehicle apparatus and the first electronic key further comprises a second processing section configured to cancel prohibition of the first electronic key from returning the response signal in response to the reception of a signal other than the first polling signal, when the second authentication section has determined that the first electronic key has been detected in a predetermined range and authentication for the first electronic key has been verified.

* * * * *